United States Patent [19]

Yanagawa et al.

[11] Patent Number: 4,955,198
[45] Date of Patent: Sep. 11, 1990

[54] CLUTCH BOOSTER

[75] Inventors: Ichiro Yanagawa; Hirohisa Hara, both of Higashimatsuyama, Japan

[73] Assignee: Jidosha Kiki Co., Ltd., Tokyo, Japan

[21] Appl. No.: 734,102

[22] Filed: May 15, 1985

[30] Foreign Application Priority Data

May 24, 1984 [JP] Japan ................. 59-105572

[51] Int. Cl.⁵ .............................................. B60T 13/20
[52] U.S. Cl. ........................................ 60/551; 91/383
[58] Field of Search ................ 60/551; 91/383, 368; 92/129, 168 B; 192/3.57

[56] References Cited

U.S. PATENT DOCUMENTS

| 2,229,247 | 1/1941 | Kamenarovic | 60/552 |
| 2,934,042 | 4/1960 | Stelzer | 60/551 |
| 3,059,434 | 10/1962 | Farmery | 60/551 |
| 3,548,981 | 12/1970 | Hill | 192/3.57 |
| 4,232,519 | 11/1980 | Dauvergne | 60/551 |
| 4,253,305 | 3/1981 | Dauvergne | 60/551 |
| 4,305,251 | 12/1981 | Dauvergne | 60/551 |
| 4,419,923 | 12/1983 | Kasahara | 92/168 B |
| 4,508,008 | 4/1985 | Belart | 91/383 |

FOREIGN PATENT DOCUMENTS 1123222 2/1962 Fed. Rep. of Germany ........ 60/551

Primary Examiner—Edward K. Look

[57] ABSTRACT

The present invention relates to an improved clutch booster equipped with a power piston and a control valve unit, and more particularly to a clutch booster wherein the control valve is operatively connected to a clutch pedal by mechanical link means and there is employed at least one pivot lever as an essential element of the link means, and wherein the pivot lever is pivotally connected to an output rod in such a manner that a manual force rendered upon the clutch pedal of a vehicle may be relayed in the directions of the output rod, thereby enabling the manual clutch operation even in the non-servo operation state where the clutch booster is left not supplied with any operating fluid pressure, and thereby eliminating the need for such complicated mechanical installation as a master cylinder, fluid pipings, etc. incorporated in the connection between the clutch pedal and the clutch booster.

7 Claims, 2 Drawing Sheets

4,955,198

CLUTCH BOOSTER

BACKGROUND OF THE INVENTION (i) Field of the Invention

The present invention relates generally to a clutch booster equipped with a power piston and control valve mechanism for use in an automobile, and more particularly to a clutch booster wherein the control valve is operatively connected to a clutch pedal by mechanical link means, and wherein there is employed at least one pivot lever as an essential element of the link means, the pivot lever being pivotally connected to an output rod in such a manner that a step-down force rendered upon the clutch pedal of a vehicle may be relayed in the directions of reciprocating motion of the output rod.

(ii) Description of the Invention

A conventional clutch booster as disclosed, for example, in the Japanese Utility Model Laid-Open Specification No. 142, 743/1979, generally employs a common construction such that the step-down force on the clutch pedal of an automobile is converted to a corresponding hydraulic pressure by way of a master cylinder incorporated in the hydraulic clutch system, with which pressure the control valve in the clutch booster may be controlled in its opening and closing actions.

With this construction, it is essentially required to adapt the master cylinder and the hydraulic pipings therefor in the hydraulic clutch system, or to provide the clutch booster with a hydraulic cylinder, and the like, which would naturally make this system complicated substantially in its mechanical construction, and consequently, result in an economical disadvantage in its production cost.

SUMMARY OF THE INVENTION

The present invention is therefore materialized to practice in an attempt to cope with such inconveniences and short comings as noted above and is essentially directed to the provision of an improved pneumatic clutch booster of relatively simple construction, which can afford an efficient solution to these noted problems, accordingly.

The invention and its other objects and advantages will become more apparent by reference to the following description of a preferred embodiment of the invention taken in conjunction with the accompanying drawings.

DETAILED DESCRIPTION OF THE INVENTION

Figure 1:
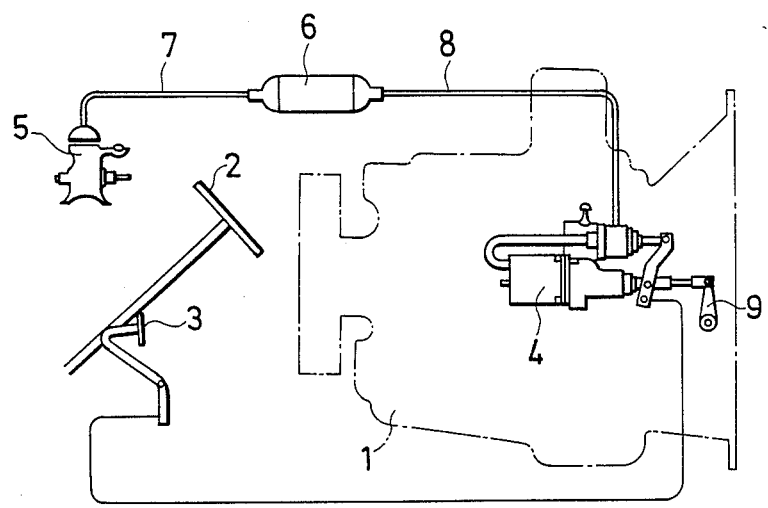
FIG. 1 is a schematic view showing the general construction of a pneumatic clutch operating mechanism incorporating the present invention to practice.

According to the entity of the present invention, there is provided, as briefly summarized, an improvement relating to the construction of a pneumatic clutch booster mechanism, which is designed for amplifying a manual force upon a clutch control device such as a clutch pedal to be relayed to a clutch engaging lever, and which comprises in combination (a) a power piston connected operatively through an output rod to the clutch engaging lever and adapted to be driven in longitudinal reciprocating motion by a pneumatic pressure supplied from an external source of pressure, (b) a control valve disposed operatively on route of an operating pressure supply passage for the operating fluid to work upon the power piston, (c) a pivot lever held pivotally at its intermediate point on the output rod, (d) a linkage cable connected operatively at its one end to the clutch pedal and at its opposite end to one end of the pivot lever and extending along the direction of reciprocating motion of the output rod, and (e) connector means adapted to connect the control valve to the opposite end of the pivotal lever and cause the control valve to operate, when the linkage cable is pushed or pulled along in the directions of reciprocating motion of the output rod.

As noted in brief hereinbefore, the present invention resides in essence in the provision of the improvement in construction of a clutch booster for use with the pneumatic clutch system such that there are provided the pivot lever mounted on the output rod of the clutch booster, the linkage cable extended for connecting operatively the pivot lever to the clutch pedal, and the connector means connecting the pivot lever to the control valve and adapted to have the control valve opened when being pushed or pulled along in the directions of reciprocating motion of the output rod, which improvement therefore can ensure a reliable dual operation of the pneumatic clutch of a vehicle in such a manner that it may duly serve a normal clutch function to amplify a step-down force rendered upon the clutch pedal like in the ordinary clutch booster mechanism during the so-called servo operation state in which the clutch booster is continuously under the normal operating pressure, and also that it may likewise serve in a clutching operation to cause a stepdown force working upon the clutch pedal to be relayed through the linkage cable and the pivot lever to the output rod in the directions of reciprocating notion thereof even in the so-called non-servo operation state in which the clutch booster is no longer supplied with the operating fluid under pressure, and in consequence, making it possible to provide a reliable manual clutch operation, accordingly.

With such an advantageous function particular to the invention, therefore, even if the clutch booster has long been put in the non-servo operation state because of a stopped engine like on an occasion such that a vehicle is parked for a long period with its transmission left in the low-geared position, it is practicably possible for the operator of the vehicle to manually put the clutch out of engagement, and then he may immediately start the engine without any trouble to put the transmission back to its neutral position.

In addition, by virtue of the employment of so-called mechanical linkage means such as comprising the linkage cable, the pivot lever and the connector means for the operative connection of the clutch pedal and the clutch booster, it is to be noted that this linkage is proven to be substantially simple in construction compared with the so-called fluid linkage means which employ the master hydraulic cylinder, the fluid pressure pipings and the like as adopted in the conventional hydraulic clutch booster mechanism, thus contributing to a substantial curtailment in the production cost of the booster peripherals involved therein.

Also, with this mechanical construction of the clutch booster mechanism, there is no need for the hydraulic cylinder for the booster, and therefore, it is feasible in practice to make the general construction of the booster mechanism substantially simple, which would then bring an immediate effect of reduction in cost therefor.

Moreover, without the employment of the fluid linkage means in this booster mechanism according to the invention, there is made available a further effect of simplified maintenance with no need for the regular inspection on the current level of the braking fluid as adapted in the ordinary fluid linkage means.

Now, with the foregoing and additional objects in view, this invention will be described in more detail by way of a preferred embodiment thereof illustrated in the accompanying drawings. FIG. 1 shows in a schematic view the general arrangement of the pneumatic clutch according to the invention, in which there are shown an internal combustion engine designated at the reference numeral 1, a steering wheel designated at 2, a clutch pedal 3, a clutch booster 4, an air compressor 5, an air reservoir 6, air hoses 7, 8 and a clutch engaging lever 9.

Figure 2:
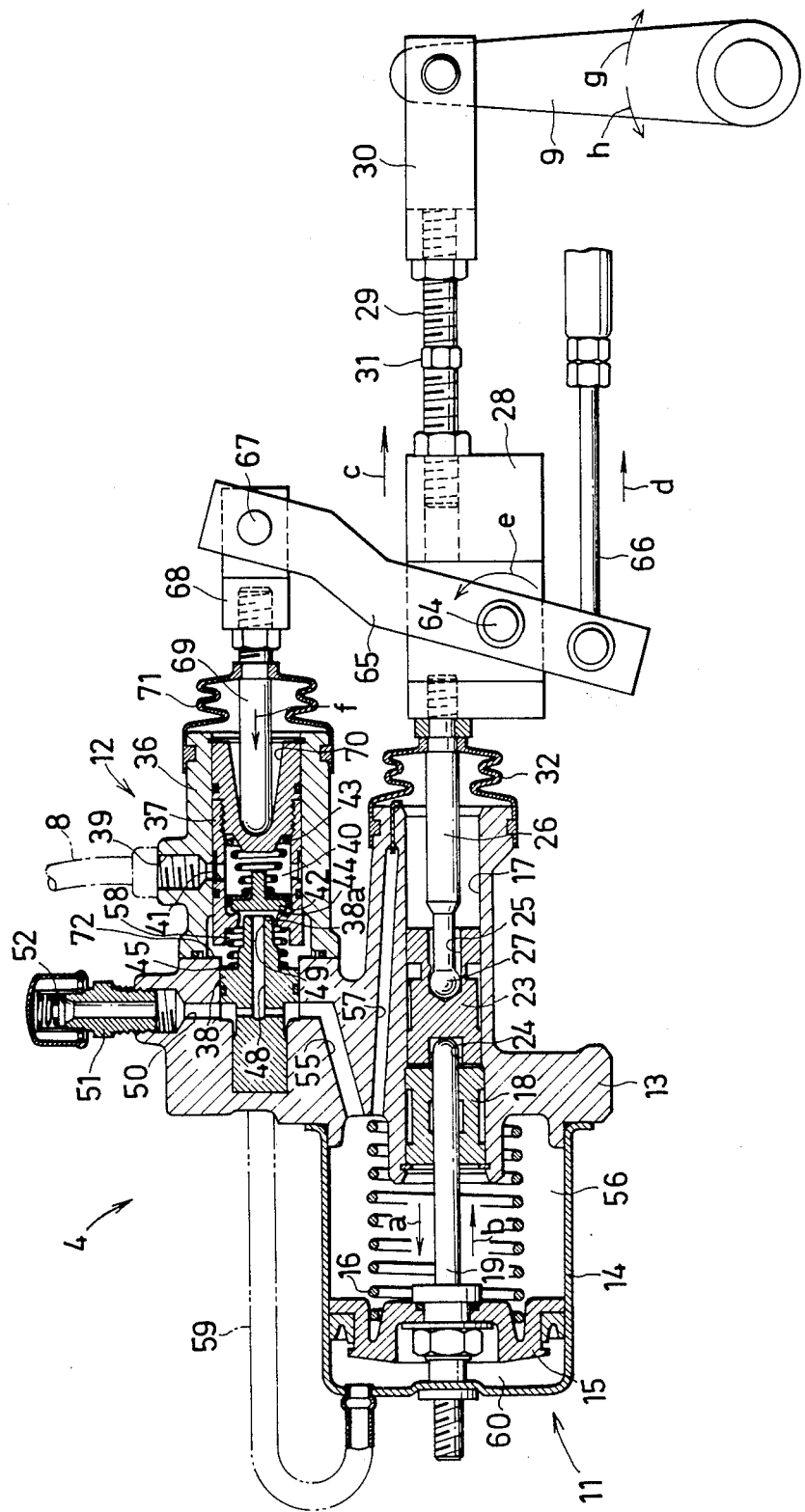
FIG. 2 is a longitudinal cross-sectional view of a pneumatic clutch booster according to the invention.

It is seen in greater detail in FIG. 2 that the clutch booster 4 comprises a power cylinder section designated at 11 and a control valve section at 12. It is also seen that the power cylinder section 11 further comprises a cylinder shell of circular cylindrical shape 14 and a power piston 15 disposed in the interior of this cylinder shell 14, the power piston 15 being normally under the urging force working in the direction shown by an arrow a as viewed in FIG. 2 by a return spring 16 inserted in the interior of the cylinder shell 14.

In a housing 13, it is shown provided a cylinder bore at 17 extending along in the direction of axis of the cylinder shell 14, into which bore 17 there is inserted a guide bushing 18 in a fixed relationship thereto. It is shown that the leading end of a rod 19 mounted securely on the power piston 15 extends slidably into the opening of the guide bushing 18.

Also, it is seen that there is inserted likewise a relay piston 23 into the cylinder bore 17. There are formed recesses 24 and 25 in the opposite ends of this relay piston 23, respectively, for such arrangement that the leading end of the rod 19 is received by one recess 24 in a telescopically slidable relationship therewith. On the other hand, it is shown that a spherical joint end 27 of an output rod 26 extends into the other recess 25 and fixed in a caulked fashion therein.

On the outer end side of the output rod 26 projecting outwardly from the cylinder bore 17, there is provided a support block 28, the support block 28 being connected operatively to the clutch engaging lever 9 by way of an adjusting screw 29 and a mount block 30. This adjusting screw 29 is threaded in the opposite hands on both sides across a lock nut portion 31 with each other, so that the adjusting screw 29 may serve to adjust a mutual distance between the support block 28 and the mount block 30 with either drawing or departing effect by adjusting the screw 29 in either screwing-in or screwing-out rotating motion.

By the way, the leading portion of output rod 26 projecting from the cylinder bore 17 is covered by an expandable boot or bellows 32 so that it may be protected from moisture, dust or the like matter entering into the cylinder bore 17.

Next, reference is made to the control valve portion 12. This control valve portion 12 is shown comprised of a cylinder 36 mounted on the housing 13, a valve piston 37 disposed operatively in the interior of the cylinder 36, and a valve lifter 38 disposed stationary in the inside of the housing 13. There is provided a pressure fluid inlet 39 in the outer circumference of the cylinder 36, through which the operating pressure may be supplied by way of the air hose 8 from the air reservoir 6.

There is also formed a valve chamber 40 in the interior of the valve piston 37, which chamber communicates with the pressure fluid inlet 39 through a communicating hole 41 formed in the circumferential wall of the valve piston 37, whereby the compressed air may be introduced into the valve chamber 40.

In the valve chamber 40, there is installed a valve element 42. This valve element 42 is biased toward the left as viewed in FIG. 2 under the resilient force of a compression spring 43 so that the element may normally be urged resting upon a valve seat 44 formed in one end of the valve piston 37. On the other hand, this valve piston 37 is biased toward the right as viewed in FIG. 2 under the urging effort of a compression spring 45 which is disposed in the space defined with the valve lifter 38 so that the valve element may normally be kept away from the leading end 38a of the valve lifter 38.

In the inside of the valve lifter 38, there is defined an exhaust passageway 48 extending along the axis of the valve lifter. It is seen that one end of this passageway 48 communicates with a vent hole 49 defined in the leading end 38a of the valve lifter 38, while the other end thereof is connected through a passage 50 in the housing 13 to a vent assembly 51. This vent assembly 51 includes a non-return or check valve 52, which is designed to pass an exhaust in the one way of discharging only. Also, the opposite end of the exhaust passageway 48 is led to an atmospheric chamber 56 of the power cylinder 11 by way of a passage 55 defined in the housing 13, and also to the cylinder bore 17 by way of another route 57, respectively.

It is also shown that there is defined a pressure regulating chamber 58 between the valve piston 37 and the valve lifter 38. This pressure regulating chamber 58 is defined in communication with a pressure chamber 60 of the power cylinder 11 by way of a piping 59, serving in such a manner that compressed air within the valve chamber 40 is introduced through the pressure regulating chamber 58 and the piping 59 into the pressure chamber 60, when the valve piston 37 shifts toward the left as viewed in FIG. 2.

There is provided a fulcrum pin 64 in the support block 28, and a pivot lever 65 is pivotally mounted at its middle point around the fulcrum pin 64. It is shown in FIGS. 1 and 2 that one end of this pivot lever 65 is operatively connected to the clutch pedal 3 by way of a working wire 66. The end of the wire 66 connected with the pivot lever 65 extends along in the directions of reciprocating motion of the output rod 26 (shown by an arrow c in FIG. 2), so that it works in such a manner that the wire 66 may be pulled in the direction shown by an arrow d in FIG. 2, when the clutch pedal 3 is stepped down by the operator of a vehicle.

On the other end of the pivot lever 65 is connected a fitting 68 by means of a pin 67, and this fitting 68 is seen threadedly connected to one end of a connecting rod 69 as a connecting means. The opposite end of this connecting rod 69 is inserted into a receiving hole 70 defined in the end of the valve piston 37. It is also seen that the outer circumference of the connecting rod 69 is covered with a boot or bellows 71 expandable in the axial direction so that moisture, dusts or the like may be prevented from entering into the inside of the cylinder 36, accordingly.

In operation, according to the construction of the clutch booster 4 as reviewed fully hereinbefore, it is appreciated that a step-down force upon the clutch pedal 3 may duly be transmitted to the clutch engaging lever 9 by function of the clutch booster 4 according to the invention, in the so-called servo operation state in which the pressure air inlet 39 is supplied with compressed air.

Referring more specifically, when the clutch pedal 3 is stepped down by the operator, the wire 66 is pulled in the direction shown by an arrow d in FIG. 2 so that the pivot lever 65 may be caused to be rotated in the direction of an arrow e. When the pivot lever 65 is rotated in this way, the connecting rod 69 is then shifted in the direction shown by an arrow f so as to force the valve piston 37, thus having the piston 37 shifted forwardly in the direction same as that of the connecting rod 69 by that urging force against the resilient force of the compression spring 45.

In consequence, the valve element 42 is forced upwardly by the leading end 38a of the valve lifter 38 relative thereto, then the vent hole 49 being closed by the valve element 42, thus vacating the valve element 42 out of the valve seat 44. Upon the shifting motion of this valve element, there will be introduced compressed air from the air reservoir 6 on route through the air hose 8, the pressure air inlet 39, the communicating hole 41, the valve chamber 40, the pressure regulating chamber 58 and the piping 59 to the pressure chamber 60 of the power cylinder 11 in this order, and consequently with thus-introduced pressure the power piston 15 is caused to be shifted in the direction as shown by an arrow b in FIG. 2 against the urging force of the return spring 16.

This force of shifting of the power piston 15 in the forward stroke is then relayed to the output rod 26 by way of the relay piston 23, thus producing the shifting motion of the output rod 26 shown by an arrow c in FIG. 2. Then, this shifting force of the output rod 26 is further relayed to the clutch engaging lever 9 by way of the support block 28, the adjusting screw 29 and the mount block 30, whereby the clutch engaging lever 9 is then caused to be displaced in rotation in the direction shown by an arrow g in FIG. 2 so as to have the clutch not shown released from its engaging position, accordingly.

At this moment, an excessive amount of air forced out of the cylinder bore 17 and the atmospheric chamber 56 owing to their displacement caused therein is then discharged outwardly from the vent assembly 51 by way of the passages 50, 55 and 57, respectively.

Next, when the clutch pedal 3 is released by the operator, the valve piston 37 is then forced to be moved in returning motion under the resilient force of the compression spring 45 and the pressure under compression within the pressure regulating chamber 58 as typically shown in FIG. 2, whereby the valve seat 44 is closed and the vent hole 49 opened by the returning valve element 42, thus bringing compressed air within the pressure chamber 60 of the power cylinder 11 to be discharged passing through the piping 59, the pressure regulating chamber 58, the vent hole 49, the exhaust passageway 48, the passage 50 and the vent assembly 51 to the atmosphere in this order.

As a consequence, therefore, the pressure within the pressure chamber 60 will drop to the atmospheric level, thus resulting in the returning motion of the power piston 15 in the direction shown by an arrow a in FIG. 2 by the urging force of the return spring 16. Also, it is seen that the clutch engaging lever 9 is caused to be displaced in rotation in the direction shown by an arrow h in FIG. 2 by returning means not shown, thus putting the clutch in the engaged position, and thus having the output rod 26 and the relay piston 23 forced to be shifted back to their respective positions as shown in FIG. 2 under the urging motion of the clutch engaging lever 9.

At this moment, it is also seen that part of compressed air passing through the exhaust passageway 48 may be introduced into the atmospheric chamber 56 and the cylinder bore 17 by way of the passages 55 and 57, thus affording changes in volumes of the atmospheric chamber 56 and the cylinder bore 17, respectively.

Referring specifically to the operation of the clutch booster 4 according to the invention in the servo operation state, it may equally serve the Proper clutching function even in the so-called non-servo operation state in which the clutch booster 4 is not supplied with compressed air at the pressure air inlet 39 like in the condition that a vehicle was left in parking.

More specifically, when the clutch pedal 3 is stepped down by the operator of the vehicle in the non-servo operation state, the valve piston 37 can equally move in the direction as shown by an arrow f in FIG. 2, as in the servo operation state as noted hereinbefore. When the valve piston 37 shifts further beyond the position abutting upon the stopper 72 of the housing 13 pulling the wire 66 in the direction as shown by an arrow d in FIG. 2, the pivot lever 65 is caused to be rotated in the counter-clockwise direction as viewed in FIG. 2 about the pin 67, thus having the support block 28, the output rod 26 and the relay piston 23 shifted all together forwardly in the direction shown by an arrow c in FIG. 2.

This force of forward motion will then be relayed to the clutch engaging lever 9 by way of the adjusting screw 29 and the mount block 30, which state will cause the clutch engaging lever 9 to be shifted in rotation in the direction as shown by an arrow g in FIG. 2, then putting the clutch not shown to be in the disengage position, accordingly.

At this moment, it is seen that the power piston 15 is resting in position as shown in FIG. 2, thus having the leading end of the rod 19 disengaged out of the relay piston 23.

Then, upon the releasing of the clutch pedal 3 by the operator, the clutch engaging lever 9 will then be shifted in rotation in the direction shown by an arrow h in FIG. 2 by function of its returning means, thus causing the clutch put in the engaging position and thus having the output rod 26 and the relay piston 23 forced back to their states shown in FIG. 2 by the urging motion of the clutch engaging lever 9. Also, the valve piston 37 is then caused to be moved in its returning stroke as shown in FIG. 2 under the resilient force of the compression spring 45.

Having described in detail herein an improved clutch booster mechanism according to the present invention specifically by way of the preferred embodiment thereof, it is to be understood that many changes and modifications may be made in the foregoing teaching without any restriction thereto and without departing from the spirit and scope of the invention. For instance, while according to the preferred embodiment noted herein, there is provided the connecting rod 69 which is adapted to connect the pivot lever 65 and the valve piston 37, it is of course possible in view of any restrictions in the construction of the control valve section 12 and/or in the direction of reciprocating motion of the valve piston 37 that there be provided any suitable linkage means workable in the connection between the pivot lever 65 and the valve piston 37, accordingly.

It is also to be understood that the appended claims are intended to cover all of such generic and specific features particular to the invention as disclosed herein and all statements relating to the scope of the invention, which as a matter of language might be said to fall thereunder.

What is claimed is:

1. A clutch booster for amplifying the manual force upon a clutch control device to be relayed to a clutch engaging lever comprising, in combination;
   (a) power piston means connected operatively through an output rod to said clutch engaging lever and driven in longitudinal reciprocating motion under the operating fluid pressure supplied from an external source of pressure, said power piston means being aligned with said output rod in a substantially straight line;
   (b) control valve means disposed on route of passage means for said operating fluid pressure to be supplied to said power piston means;
   (c) pivot lever means mounted pivotally at the middle portion thereof on said output rod;
   (d) linkage or cable means connected operatively at one end thereof of said clutch control device and at the opposite end to one end of said pivot lever means, and extending along in the directions of reciprocating motion of said output rod;
   (e) relay piston means operatively connected to said power piston means and to said output rod, said relay piston means includes a movable connector joint operatively connected to one end of said output rod for permitting a swinging motion of said output rod as motion is imparted thereto through said pivot lever means; and
   (f) connector means connecting operatively said control valve means to the opposite end of said pivot lever means, and adapted to operate said control valve means when said linkage or cable means are pushed or pulled in the direction of forward stroke motion of said output rod means.

2. The clutch booster as claimed in claim 1 wherein the axis of said power piston means and said control valve means are aligned in parallel with each other.

3. The clutch booster as claimed in claim 2 wherein said connector means is a physical connecting rod.

4. The clutch booster as claimed in claim 3 wherein said linkage or cable means is a working wire.

5. The clutch booster as claimed in claim 2 wherein said linkage or cable means is a working wire.

6. The clutch booster as claimed in claim 1 wherein said linkage or cable means is a working wire.

7. A clutch booster according to claim 1, wherein said movable connector joint includes a spherical aperture within said relay piston means and a spherical ball positioned at the end of said output rod, said spherical ball is disposed within said spherical aperture to permit a swing motion therebetween.

* * * * *